June 2, 1964 J. NAIGRAW 3,135,004
WIPING AND CLEANING MECHANISM FOR EXTERNAL REAR VISION MIRRORS
Filed Sept. 13, 1962 3 Sheets-Sheet 1

JOHN NAIGRAW
INVENTOR.

ATTORNEY

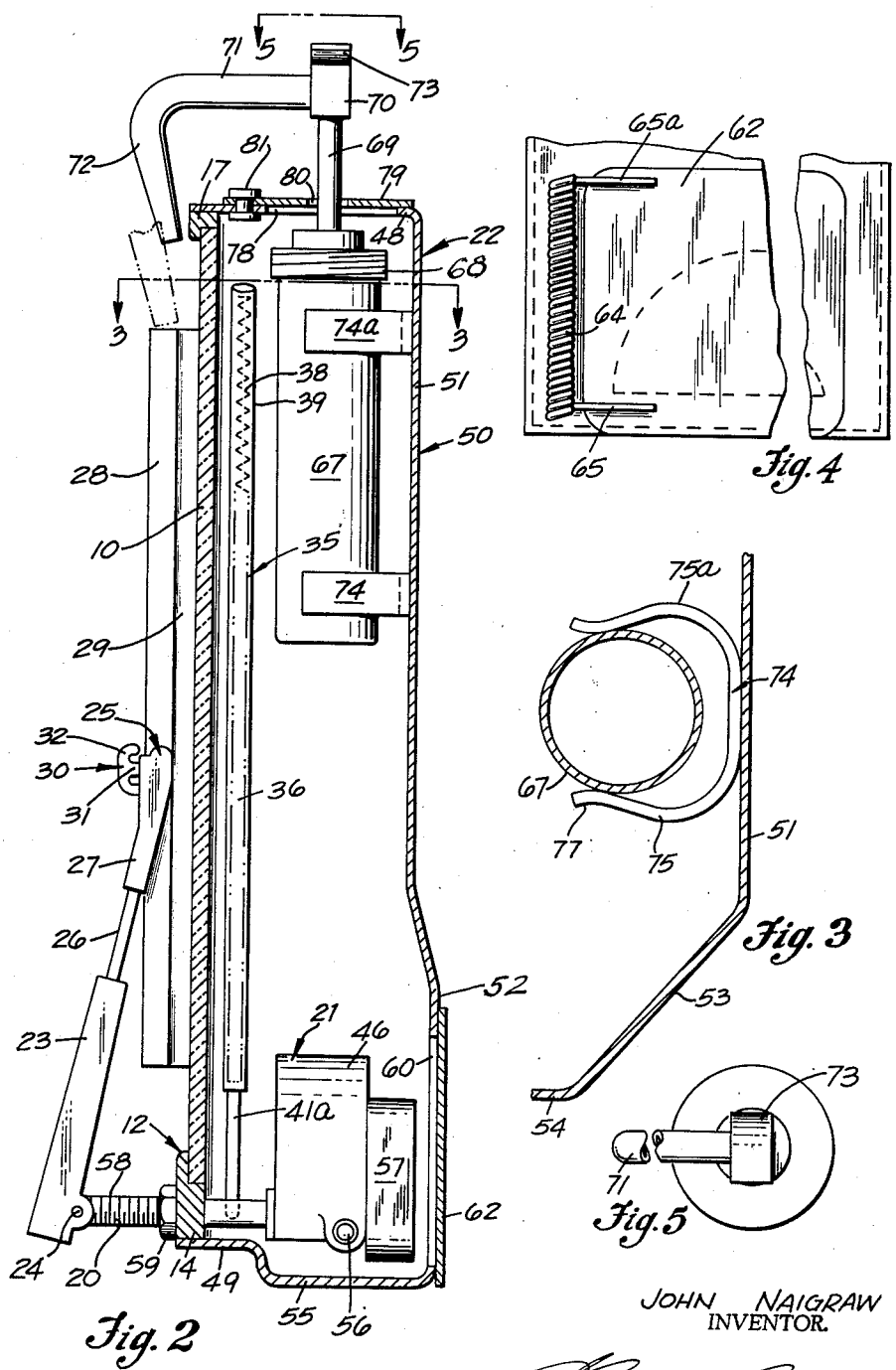

June 2, 1964    J. NAIGRAW    3,135,004
WIPING AND CLEANING MECHANISM FOR EXTERNAL REAR VISION MIRRORS
Filed Sept. 13, 1962    3 Sheets-Sheet 3
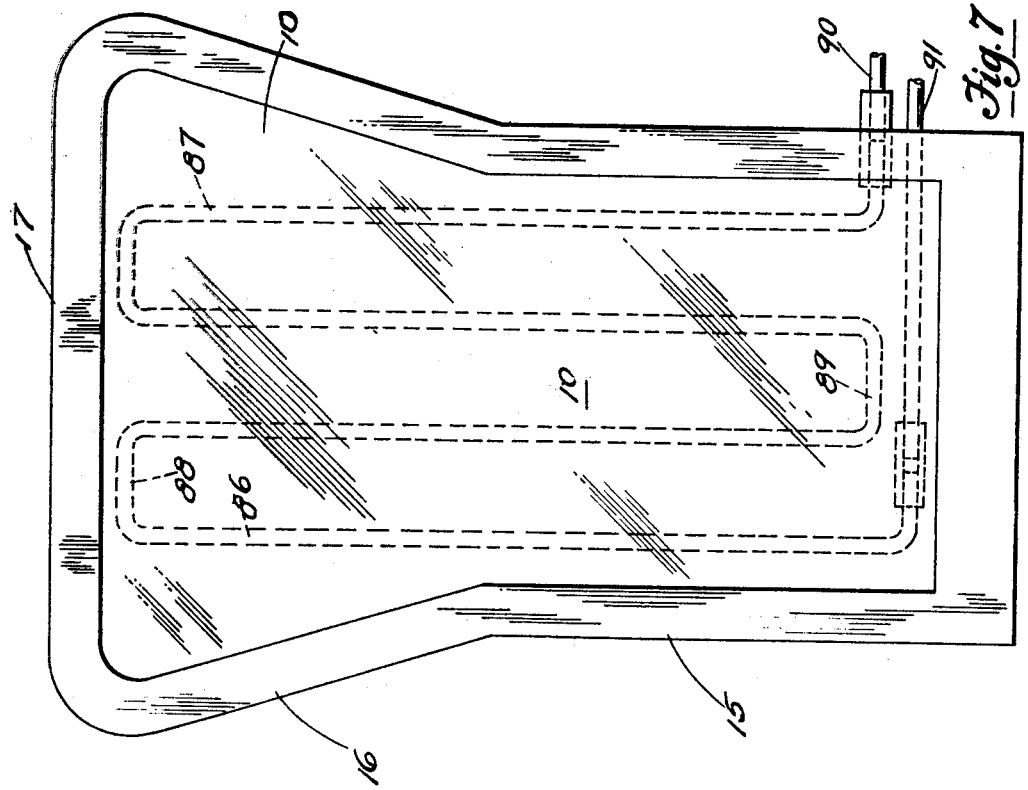
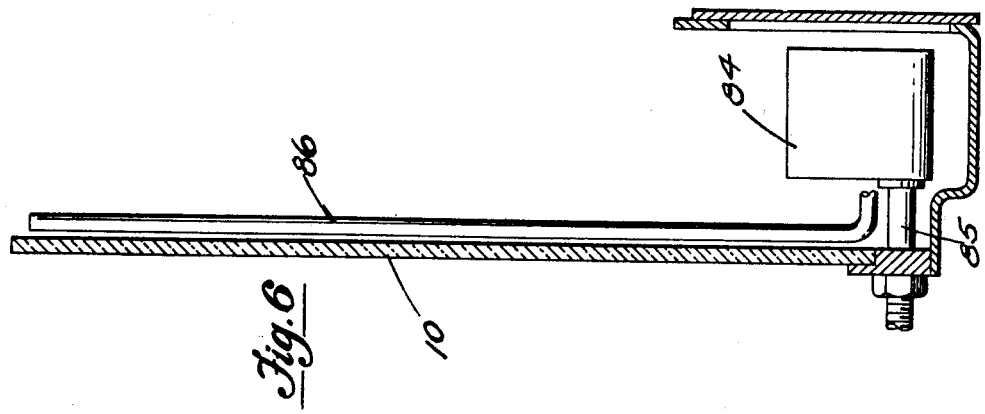
JOHN NAIGRAW
INVENTOR.
BY
ATTORNEY United States Patent Office 3,135,004
Patented June 2, 1964

3,135,004
WIPING AND CLEANING MECHANISM FOR
EXTERNAL REAR VISION MIRRORS
John Naigraw, 59—63 59th St., Maspeth, N.Y.
Filed Sept. 13, 1962, Ser. No. 223,352
11 Claims. (Cl. 15—250.01)

This invention relates to rear vision mirrors for motor vehicles, such as motor trucks, trailers, passenger vehicles and other types of vehicles and is particularly directed to a combination of a wiping device for use in conjunction with such mirrors, where the mirrors are mounted externally at the side or other location relative to the vehicle.

The primary object of the invention is to provide a combination wiping and cleaning device for cleaning rear vision mirrors to remove snow, rain or other coatings from the exposed surface of the mirror.

Where rear vision mirrors are mounted on the cabs of trucks, tractors, or other similar vehicles, they are generally attached to the side of the vehicle and are therefore exposed to the elements, so that in snow, rain, or other inclement weather, the surface of the mirror is coated with snow, sleet or rain so that the operator's vision is obstructed entirely or obscured.

A major object of the invention is to provide a combination wiping and cleaning means which is supported within the housing or casing supporting the rear vision mirror in order to remove therefrom snow, rain, mud or other surface coatings, which are deposited on the face of the mirror.

Another object is to provide in conjunction with such a rear vision mirror wiping device, means for heating the mirror in order to melt any snow, ice, sleet or frost from the surface of the mirror thus enabling the wiping mechanism to operate and clear the surface of the mirror even under extreme weather conditions when the mirror is coated with ice, snow or mixtures of ice, snow, sleet, mud and like.

Another feature of the invention is that in combination with the wiping mechanism means is provided for spraying either a defrosting fluid, or a cleaning fluid on the outer surface of the mirror, thus enabling the flexible blade of the wiping mechanism to operate under extreme conditions of snow, frost, sleet and the like and to clean the surface of the mirror under all operating conditions.

Another feature of the invention is that all operating parts of the mechanism except the wiper blade and its support mechanism are mounted within the housing supporting the mirror, thus providing a simple, compact operating mechanism which is protected from the elements at all times and under all operating conditions.

Another feature of the invention is that the entire mechanism is simple, compact and readily controllable by the operator of the vehicle.

The accompanying drawings, illustrative of one embodiment of my invention together with the description of its construction and the method of operation, mounting and utilization thereof, will serve to clarify further objects and advantages of my invention.

In the drawings:

FIG. 2 is a vertical section through the rear vision mirror, shown in FIG. 1, showing the mirror, the wiper blade and the support and drive mechanism therefor and also the cylindrical containers supporting the liquids which are used in conjunction with the face of the mirror.

FIG. 3 is a cross-section through a portion of the mirror support housing, showing one of the cylindrical containers shown in FIGS. 1, and 2, showing the method of removably supporting the cylindrical containers.

FIG. 4 is a rear elevational view of the mirror housing shown in FIGS. 1 and 2, showing a snap door used to provide access to the wiper blade drive motor shown in FIGS. 1 and 2.

FIG. 5 is a plan view of a portion of the spray mechanism used in conjunction with one of the liquid containers shown in FIGS. 1 and 2.

FIG. 6 is a vertical section, similar to FIG. 2, through a modification of the construction shown in FIG. 2, in which an electric motor is used for driving the wiper blade.

FIG. 7 is a front elevational view, similar to FIG. 1, of a modification of the construction shown in FIG. 1, in which heating tubes are used to supply fluid for heating the rear vision mirror.

Figure 1:
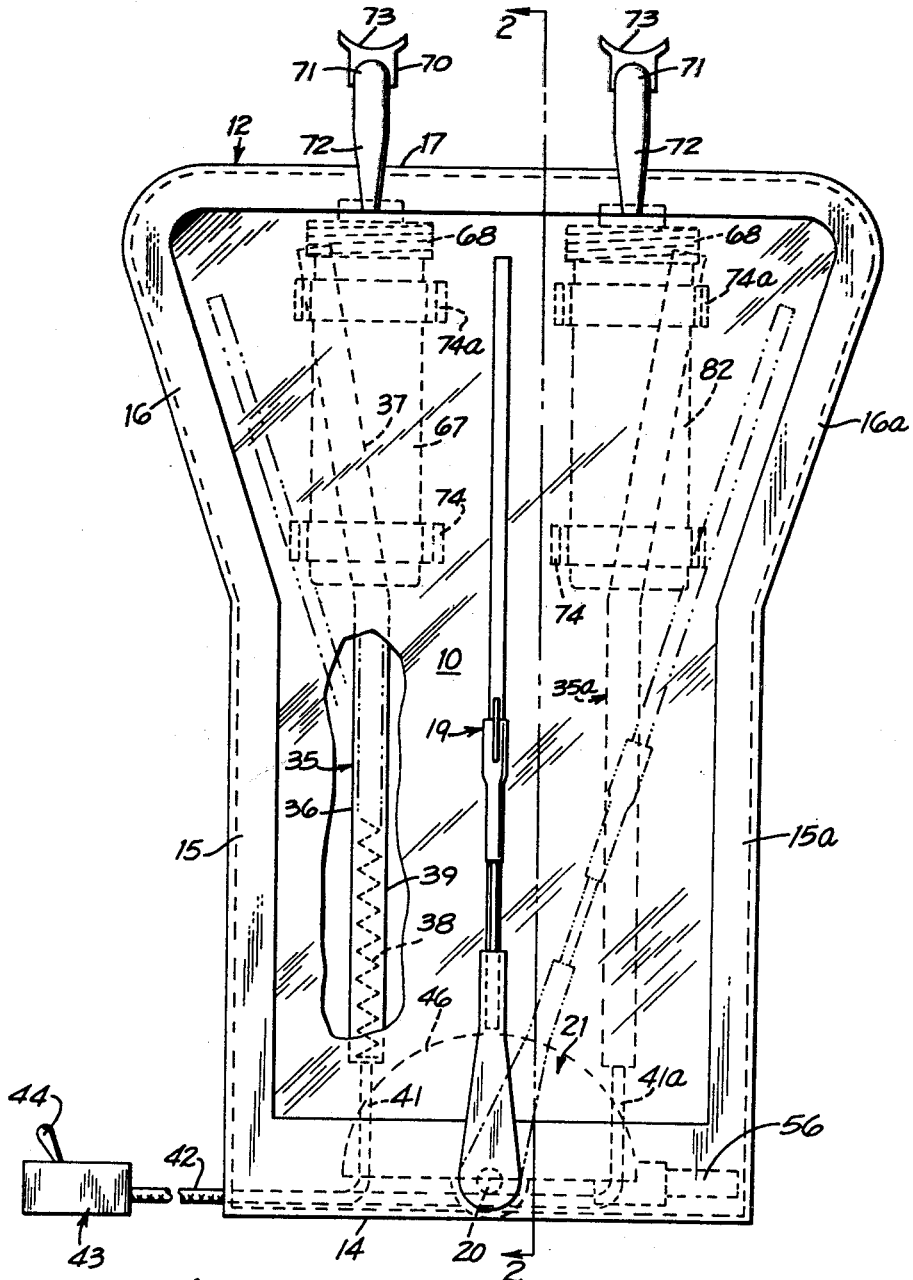
FIG. 1 is a front elevational view of a rear vision mirror fitted with a wiper blade and the support and control mechanism therefor, also showing the heater mechanism, and the containers for supporting the fluids used in conjunction with the face of the mirror.

It will be understood that the following description of construction and the method of operation and utilization of the wiping and cleaning mechanism for rear vision mirrors, is intended as explanatory of the invention and not restrictive thereof.

In the drawings, the same reference numerals designate the same parts throughout the various views, except where otherwise indicated.

One embodiment of the rear vision mirror shown in FIGS. 1 and 2, comprises a mirror 10 made of silvered glass or other suitable material, the mirror being of basically rectangular contour, the upper portion of the sides of the mirror sloping outward, as shown in FIG. 1, to provide a wider range for the angular movement of the blade of the wiper, as hereinafter described.

The mirror proper is supported by and surrounded by a frame 12, shown in FIGS. 1 and 2, the frame consisting of a deep relatively narrow bottom section 14, a pair of side sections 15, 15a attached to the bottom section, a pair of sloping auxiliary side sections 16, 16a and a top section 17 which is wider than the bottom section, the top section being fixedly attached to the auxiliary side sections, the junction between the top section 17 of the frame, and the auxiliary side sections being rounded, as shown in FIG. 1.

The frame of the mirror, and the mirror proper may be mounted at one side, or both sides of the cab of a motor vehicle, such as a truck, or tractor, to provide a view of the condition of the road behind the truck, passenger vehicle or other vehicle on which the mirror is mounted.

A mirror wiper 19 is mounted adjacent the open face of the mirror, the wiper being oscillated by a reversibly rotating shaft 20, which is driven by a vacuum or electrically driven motor 21, which is fitted to the lower portion of a housing 22, which is fixedly attached to and surrounds the frame 12 of the mirror.

The wiper is supported by a hollow support casing 23, which is pivotally attached to the shaft 20 of the motor by a pivot pin 24 or other suitable pivot means.

The blade support casing has a blade support member fitted thereto, the blade support member consisting of a blade support channel 25, which supports the blade, and a support rod 26, which is fixedly attached to and supports the channel, the end of the support rod 26 opposite the channel being reciprocatively supported by the blade support casing, spring means being provided within the casing 23, to force the support rod outward relative to the casing, the support rod moving the channel outward with it.

The blade support channel 25 has a tubular section 27 integral with the lower portion thereof, the tubular section being fitted to the upper end of the support rod 26 and clamped thereto, to support the channel 23 and the wiper blade which is supported thereby.

The wiper blade proper which is supported by the channel comprises a metal frame 28, which has a thin flexible blade 29, made of rubber or other suitable material attached thereto, the blade proper being operative to engage the face of the mirror to clean the face of the mirror, the blade flexing so that it thoroughly clears the outer face of the mirror.

The blade frame 28, which is substantially straight is of U-shaped channel cross-section, the flexible blade proper being clamped between the sides of the channel frame 28, which are pressed against the faces of the blade, a bead being formed at the outer edge of the frame and a mating bead at the outer edge of the wiper blade to retain the wiper blade within the blade support frame.

The blade support channel 25 has a blade holder of arcuate contour integral therewith and extending outward therefrom. The blade holder 30 consists of a central section 31, and an arcuate outer section 32. The central section of the blade holder is fitted through a slot through the rear wall of the blade support channel to adjustably support the blade, and allow the blade to flex to a limited extent in a plane through the blade proper, thereby allowing the blade proper to follow the face of the mirror and take up the angular displacement between the support rod and the blade proper.

In order to defrost the mirror 10 and melt any snow, ice or sleet, which may form on the outer face of the mirror 10, a pair of heating elements 35, 35a is mounted within the housing 22, adjacent the rear face of the mirror 10.

Each of the heating elements 35, 35a, consists of a substantially vertical section 36, which is located substantially parallel to each side section 15, 15a of the mirror frame 12, and an outwardly sloping section 37, which is located near each sloping side section 16, 16a of the frame 12.

Each of the heating elements 35, 35a consists of a coil or other form of resistance wire 38, which is imbedded in a casing 39, made of a ceramic composition, or other suitable heat resistant material, which supports the resistance wire.

A lead line 41, 41a which is connected to the resistance wire 38 of each of the heating elements 35, 35a is connected to or integral with a connecting line 42, which is connected to a snap switch 43, or other type of switch, which is mounted on the instrument panel of the vehicle, on which the mirror 10 is mounted.

The switch 43 is actuated by a manually controlled snap lever 44, a snap button, or other type of manually operable control member which is fitted to the switch 43, to facilitate manual operation of the switch.

Where the blade actuating shaft 20 is driven by a vacuum operated motor 21, as shown in FIGS. 1 and 2, the vacuum operated motor is supported within a hollow case 46, of semi-cylindrical form, the case being mounted in the lower portion of the housing 28 which is fixedly attached to the mirror frame.

The housing 22 which is hollow consists of an upper wall 48, which is attached to the upper section of the frame, a bottom wall 49, which is fixedly attached to the bottom section of the mirror frame 12, and a rear wall 50, the rear wall which is made of sheet metal or other suitable material, the rear wall being integral with, welded to, or otherwise fixedly attached to the top end bottom walls of the housing.

The rear wall 50 of the housing is formed in two sections including an upper section 51 which is located closer to the mirror 10, and a bottom section 52, which is located further from the rear face of the mirror 10 to allow more room for the case 46 of the motor.

As shown in FIG. 3, a pair of sloping auxiliary side sections 53 is integral with the rear wall 50 of the housing, each auxiliary side section 53 being integral with or fixedly attached to the adjacent side wall 54 of the housing as shown in FIG. 3.

As shown in FIG. 2, a depressed auxiliary bottom wall 55, is located adjacent the bottom wall 49 of the housing, the auxiliary bottom wall being lower than the bottom wall 49 of the housing to provide room for the case 46 of the motor, and the auxiliary case 57 which is integral with, or attached to and extends rearward beyond the main case 46 of the motor.

In order to supply a vacuum for operating the motor 21, a tubular vacuum inlet line 56 is integral with or attached to the lower portion of the case 46, the vacuum inlet line being connected by a tubular flexible line (not shown) to the intake manifold of the engine of the vehicle, or a vacuum pump in the conventional manner.

The projecting portion of the motor shaft, which projects beyond the bottom section 14 of the frame is externally threaded 58, a nut 59, or other type of internally threaded member being fitted to the threaded portion of the shaft 20 to longitudinally locate the shaft relative to the bottom section 14 of the frame 12.

In order to allow the motor to be inserted into the housing 22 through the rear wall 50 thereof, an opening 60 is cut through the lower section 52 of the rear wall of the housing, the opening 60 which is larger than the outer contour of the case being of substantially semi-circular contour, following the outer contour of the motor case 46 to allow the motor case 46 be inserted therethrough.

In order to close the opening 60 through the rear wall 50 of the housing 22, a door 62, or other type of closing means covers the opening 60 through the rear wall 50 of the housing, the door 62 which is of rectangular of other suitable contour, to fully cover the opening, is hingedly supported by one or more hinges, located at one side of the door 62.

The door is retained in the closed position by a pair of torsion springs 64 located at the hinged side of the door, the upper and lower end of the springs each having a spring arm 65, 65a integral therewith, each spring arm being located near the adjacent upper or lower edge of the door, the spring arms being operative to normally retain the door in the closed position shown in FIG. 4.

A knob or handle may be attached to the end of the door 62 opposite the torsion springs 64, to facilitate opening the door against the pressure of the torsion springs 64.

In order to clean the open face of the mirror, a hollow cylindrical container 67, is mounted within the housing 22, at one side of the center of the mirror 10 as shown in FIG. 1, the container being filled with a glass cleaning fluid, such as Windex or a similar material.

The container has a thin tubular plastic or metal cap 68 threadably, or otherwise attached thereto. The cap 68 of the container has a tubular plunger 69 reciprocatively fitted thereto, the plunger 69 when pressed downward into the container being adapted to raise a portion of the liquid in the container, and force it upward through a tubular nozzle which is integral with or attached to the cylindrical top 70 of the plunger. The nozzle consists of a hollow cylindrical section 71, and a tapered tubular discharge section 72, the tubular discharge section being angularly positioned relative to the vertical axis of the plunger, the open end of the discharge section 72 of the nozzle directing a spray of window cleaning fluid from the container toward the outer surface of the mirror in order to clean the outer surface of the mirror. A tubular arcuate section integral with the discharge section of the nozzle, connects the cylindrical section 71 with the discharge section 72 thereof. The upper end of the plunger has a head 73 of concave arcuate cross-sectional contour integral therewith, the head being operative to receive the finger of an operator to facilitate moving the plunger 69 into the container.

The container 67 is supported by a pair of spring clips 74, 74a attached to the rear wall of the housing 22, as shown in FIG. 3. One of the spring clips is located near the bottom of the container 67, with the second spring clip located near the upper end thereof, below the cap 68.

Each of the spring clips 74, 74a consists of a relatively flat rear section, which is fixedly attached to the rear wall 50 of the housing and a pair of spring side sections 75, 75a of arcuate contour, the side sections being integral with the rear section, each side section terminating in a lip 77 of arcuate cross-section at the forward or open end of the clip.

In order to insert the container through the top wall 48 of the housing, a substantially circular opening 78, is cut through the top wall 48 of the housing, the opening being coaxially aligned with the vertical axis of the container, and of larger diameter than the container to allow the container to be inserted therethrough into the housing, in order to close the opening 78 through the top wall 48 of the housing after the container 67 is inserted therethrough, a flat cover 79 is fitted to the top wall of the housing above the opening 78. The flat cover 79 which has a narrow slot 80 therethrough to clear the cylindrical plunger when the cover is rotated, is pivotally attached to the top wall of the housing by a double-headed rivet 81 or other suitable pivot means, to enable the cover to be moved into the closed positions shown in FIG. 2, after the container is inserted in place.

In order to defrost the face of the mirror 10 when it is coated with sleet or ice, to enable the wiper blade to clean it and remove the frozen material, a second hollow cylindrical container 82 is mounted at the opposite side of the center of the mirror 10, as shown in FIG. 1, the second container being filled with a defroster spray fluid, such as Prestone defroster spray or the like.

The second container which is substantially the same as the container 67, also has a thin tubular metal or plastic cap, threadably or otherwise attached thereto. The cap of the container reciprocatively supports a tubular plunger 69, the plunger 69 when pressed downward being operative to raise a portion of the fluid in the container, and force it upward and out through a tubular nozzle which is integral with, or attached to the cylindrical top of the plunger. The nozzle which is substantially the same as that fitted to the container 67, consists of a hollow cylindrical section 71, and a tapered tubular discharge section 72, the tubular discharge section being angularly positioned relative to the vertical axis of the plunger, the open end of the tubular discharge section being directed toward the face of the mirror, to enable the fluid discharged from the container to be directed in the form of a spray toward the face of the mirror. This spray of defroster or anti-freeze fluid material breaks up any ice or sleet formed on the surface of the mirror, and enables the wiper blade to remove the material from the outer face of the mirror.

A tubular arcuate section integral with the discharge section and the cylindrical section 71 of the nozzle connects the cylindrical section with the discharge section of the nozzle. The upper end of the reciprocating plunger has a head 73 integral therewith, the head being located above the cylindrical top 70 of the plunger. The head is of concave arcuate cross-sectional contour to enable it to receive the finger of an operator, thus enabling him to manually force the plunger downward into the operative position.

The container 82 is supported by a pair of spring clips 74, 74a attached to the rear wall 50 of the housing in the same manner as that shown in FIG. 3, which supports the container 67.

The individual spring clips 74 which are made of spring strip material are constructed in the manner shown in FIG. 3, and hereinbefore described.

The container 82 is inserted through a second opening through the top wall of the housing 22 in the same manner as the container 67, the opening being coaxially aligned with the vertical axis of the container.

A flat cover 79 substantially as shown in FIG. 2, is fitted to the top wall 48 of the housing above the second opening. The flat cover 79 is constructed in the same manner as that shown in FIG. 2, and is pivotally supported by a double headed rivet 81, or other type of pivot support means, to enable the cover to be moved into the closed position shown in FIG. 2, after the container is inserted into its required position relative to the spring clips 74, 74a.

In place of the electrically operated defroster mechanism, shown in FIGS. 1 and 2, and hereinbefore described, a hot water heating and defrosting mechanism may be substituted.

A plurality of tubes through which hot water is circulated may be located within the housing, adjacent the rear face of the mirror, in the same general position as the heating elements shown in FIGS. 1 and 2. Hot water would be supplied to the tubes mounted adjacent the mirror by a flexible tube connected to the water jacket of the engine, the vehicle heater or other suitable hot water source, thereby supplying hot water to defrost the mirror in substantially the same manner as the heating elements 35, 35a, shown in FIGS. 1 and 2, and hereinbefore described.

The mirror 10 may be of the size and contour shown in FIG. 2, or of other suitable size and contour, depending upon the requirements of a particular installation.

The mirror and the attachments therefor may be mounted on the sides of the cab of a truck or tractor, a trailer unit, or other vehicle. In passenger vehicles in which smaller mirrors are generally used, essentially the same wiping, cleaning and defrosting mechanism may be used, the various components being scaled down to suit the requirements of a smaller mirror.

The motor driving the wiper blade may be vacuum operated as shown in FIGS. 1 and 2, and hereinbefore described, or an electrically driven and controlled motor may be substituted therefor.

In place of the vacuum operated motor, such as that shown in FIG. 2, an electrically driven motor 84, may be substituted, the motor driving a reversibly rotating shaft 85 which oscillates the blade of the windshield wiper in the same manner as that shown in FIG. 2.

In order to heat the rear face of the mirror 10, shown in FIG. 6, a plurality of parallel tubes 86, 87, made of aluminum, or other high conductivity material may be mounted adjacent the rear face of the mirror, the tubes having a heated fluid or liquid such as ethylyne glycol or a similar material fed therethrough, to heat the surface of the mirror in place of the heating elements shown in FIG. 1.

The ends of the tubes are connected by a plurality of connecting sections 88, 89, to supply a continuous flow of fluid through the tubes.

An inlet end 90 is connected to one end tube, the inlet end being connected to a pump (not shown) to feed fluid through the tubes.

The outlet end 91 which is connected to the opposite end tube is connected to the opposite end of the pump, to draw the fluid through the tubes, thereby maintaining a continuous flow of heating fluid through the tubes.

It will be apparent that those skilled in the art that the present invention is not limited to the specific details described above and shown in the drawings, and that various additional modifications are possible in carrying out the features of the invention and the operation, actuation, and the method of utilization thereof, without departing from the spirit and scope of the appended claims.

What is claimed is:

1. A wiping and cleaning mechanism for use in combination with a rear vision mirror for motor vehicles, comprising a frame surrounding a rear vision mirror, a hollow housing surrounding and attached to said frame, said housing extending rearwardly of the mirror, a rotatable shaft supported by said frame and extending therethrough, drive means operative to reversibly oscillate said shaft, blade support means attached to said shaft, a wiper blade pivotally supported by the blade support means, said wiper blade being operative to sweep across the reflecting face of the mirror, heating means mounted within said housing, adjacent the face of the mirror opposite the reflecting face thereof, and a plurality of fluid filled hollow containers mounted within said housing, each of said fluid filled containers having fluid spray means removably attached thereto, said fluid spray means including a tubular nozzle directed toward the reflecting face of the mirror, said spray means being operative to direct a fluid mist against the reflecting face of the mirror, the hollow housing including a rear wall and a top wall, the means removably supporting the hollow containers including a plurality of spring clips fixedly attached to the rear wall of the housing, each of said spring clips being operative to removably support one of the containers, the top wall of the housing having a plurality of openings therethrough, each of the openings being axially aligned with one of the containers, a cover pivotally attached to the top wall of the housing in alignment with each of said openings, said covers being operative to close said openings.

2. A wiping and cleaning mechanism for a rear vision mirror, as in claim 1, in which the heating means includes a plurality of electrically energized heating elements located adjacent the non-reflecting face of the mirror, and means electrically connecting each of the heating elements to an externally mounted electrical energy source, said heating elements being operative to melt frozen material deposited on the reflecting face of the mirror, the wiper blade including a relatively thin blade of a highly flexible material, the drive means being an electrically energized motor mounted within the housing, the rear wall of said housing having an opening therethrough in substantial alignment with the electrical energized motor, a hinged door attached to the rear wall of the housing adjacent the opening therethrough, said hinged door being operative to cover the opening, and spring means supported by the rear wall, operative to engage the hinged door to normally retain the hinged door in the closed position.

3. A wiping and cleaning mechanism for a rear vision mirror, as in claim 1, in which one of the fluid containers is filled with a window cleaning spray fluid, said spray means including manually controllable means operative to spray a mist of fluid through the fluid nozzle, said fluid mist being operative to clean the reflecting face of the rear vision mirror when the wiper blade is moved across the reflecting face of the mirror.

4. A wiping and cleaning mechanism for rear vision mirrors, as in claim 1, in which one of the fluid containers is filled with an anti-freeze solution, said spray means including manually controllable means operative to spray a mist of fluid through the fluid nozzle, said fluid spray mist being operative to melt frozen material deposited on the reflecting face of the mirror.

5. A wiping and cleaning mechanism for rear vision mirrors, as in claim 1, in which the wiper blade includes a relatively thin blade formed of a highly flexible material, said thin flexible blade being operative to deflect when the wiper blade is oscillated across the reflecting face of the rear vision mirror, the drive means being a vacuum operated motor mounted within said housing.

6. A wiping and cleaning mechanism for rear vision mirrors, as in claim 1, in which the wiper blade includes a relatively thin blade formed of a highly flexible material, said flexible blade being operative to deflect when the blade is oscillated across the reflecting face of the rear vision mirror, the drive means being an electrically energized motor mounted within said housing.

7. A combination wiping and cleaning mechanism for rear vision mirrors, as in claim 1, in which the heating means includes a plurality of tubes located adjacent the non-reflecting face of the mirror, and means connected to said tubes operative to circulate a heating fluid through said tubes, said heating fluid being operative to melt frozen material deposited on the reflecting face of the mirror.

8. A combination wiping and cleaning mechanism for use in combination with a rear vision mirror for motor vehicles, comprising a frame surrounding a rear vision mirror, a hollow housing surrounding and attached to said frame, said housing extending rearwardly therethrough, a rotatable shaft fitted to said frame and extending therethrough, drive means operative to reversibly oscillate said shaft, blade support means attached to said shaft, a wiper blade pivotally supported by the blade support means, said wiper blade being operative to sweep across the reflecting face of the mirror, heating means mounted within said housing adjacent the non-reflecting face of the mirror, a plurality of fluid-filled hollow containers mounted within said housing, means removably supporting said containers, each of said hollow containers having fluid spray means removably attached thereto, said fluid spray means including a tubular nozzle angularly directed toward the reflecting face of the mirror, said fluid spray means being operative to direct a fluid mist toward the reflecting face of the mirror, the hollow housing including a rear wall and a top wall, the means removably supporting the hollow containers including a plurality of spring clips fixedly attached to the rear wall of the housing, each of said spring clips being operative to removably support one of the containers, the top wall of the housing having a plurality of openings therethrough, each of the openings being axially aligned with one of the containers, a cover pivotally attached to the top wall of the housing in alignment with each of said openings, said covers being operative to close said openings.

9. A combination wiping and cleaning mechanism for use in combination with a rear vision mirror for motor vehicles, comprising a frame surrounding a rear vision mirror, a hollow housing surrounding and attached to said frame, said housing extending rearwardly of the mirror, a rotatable shaft fitted to said frame and extending therethrough, drive means operative to reversibly oscillate said shaft, blade support means attached to said shaft, a wiper blade pivotally supported by the blade support means, said wiper blade being operative to sweep across the reflecting face of the mirror, heating means mounted within said housing adjacent the non-reflecting face of the mirror, a plurality of fluid-filled hollow containers mounted within said housing, means removably supporting said containers, each of said hollow containers having fluid spray means removably attached thereto, said fluid spray means including a tubular nozzle angularly directed toward the reflecting face of the mirror, said fluid spray means being operative to direct a fluid mist toward the reflecting face of the mirror, the housing including a rear wall and a top wall, the wiper blade including a relatively thin blade formed of a highly flexible material, said blade being operative to deflect when the wipe blade is oscillated across the reflecting face of the mirror, the drive means being a vacuum operated motor mounted within said housing, the rear wall of said housing having an opening therethrough in substanital alignment with the vacuum operated motor, a hinged door attached to the rear wall, adjacent the opening in the rear wall of the housing, said hinged door being operative to cover the opening, and spring means supported by the rear wall operative to engage the hinged door, to normally retain the door in the closed position.

10. A combination wiping and cleaning mechanism for use in combination with a rear vision mirror for motor vehicles, comprising a frame surrounding a rear vision mirror, a hollow housing surrounding and attached to said frame, said housing extending rearwardly of the mirror, a rotatable shaft fitted to said frame and extending therethrough, drive means operative to reversibly oscillate said shaft, blade support means attached to said shaft, a wiper blade pivotally supported by the blade support means, said wiper blade being operative to sweep across the reflecting face of the mirror, heating means mounted within said hosuing adjacent the non-reflecting face of the mirror, a plurality of fluid filled hollow containers mounted within said housing, means removably supporting said containers, each of said hollow containers having fluid spray means removably attached thereto, said fluid spray means including a tubular nozzle angularly directed toward the reflecting face of the mirror, said fluid spray means being operative to direct a fluid mist toward the reflecting face of the mirror, the housing including a rear wall and a top wall, the wiper blade including a relatively thin blade of a highly flexible material, the drive means being an electrically energized motor mounted within the housing, the rear wall of said housing having an opening therethrough in substantial alignment with the electrically energized motor, a hinged door attached to the rear wall of the housing adjacent the opening therethrough, said hinged door being operative to cover the opening, and spring means supported by the rear wall, operative to engage the hinged door to normally retain the hinged door in the closed position.

11. A combination wiping and cleaning mechanism for use in combination with a rear vision mirror for motor vehicles, comprising a frame surrounding a rear vision mirror, a hollow housing surrounding and attached to said frame, said housing extending rearwardly of the mirror, a rotatable shaft fitted to said frame and extending therethrough, drive means operative to reversibly oscillate said shaft, blade support means attached to said shaft, a wiper blade pivotally supported by the blade support means, said wiper blade being operative to sweep across the reflecting face of the mirror, heating means mounted within said housing adjacent the non-reflecting face of the mirror, a plurality of fluid filled hollow containers mounted within said housing, means removably supporting said containers, each of said hollow containers having fluid spray means removably attached thereto, said fluid spray means including a tubular nozzle angularly directed toward the reflecting face of the mirror, said fluid spray means being operative to direct a fluid mist toward the reflecting face of the mirror, the housing including a rear wall and a top wall, the means removably supporting the hollow containers including a plurality of spring clips fixedly attached to the rear wall of the housing, each of said spring clips being operative to removably support one of the hollow containers, the wiper blade including a relatively thin blade of a highly flexible material, the drive means being an electrically energized motor mounted within the housing, the rear wall of said housing having an opening therethrough in substantially alignment with the electrical energized motor, a hinged door attached to the rear wall of the housing adjacent the opening therethrough, said hinged door being operative to cover the opening, and spring means supported by the rear wall, operative to engage the hinged door to normally retain the hinged door in the closed position.

References Cited in the file of this patent

UNITED STATES PATENTS

| | | |
|---|---|---|
| 2,622,261 | Smith | Dec. 23, 1952 |
| 2,722,160 | Prutzman | Nov. 1, 1955 |
| 2,944,277 | Ochello et al. | July 12, 1960 |

FOREIGN PATENTS

| | | |
|---|---|---|
| 764,704 | Great Britain | Jan. 2, 1957 |